June 18, 1946.     J. A. SAFFIR     2,402,259
ARTIFICIAL TOOTH
Filed June 12, 1942
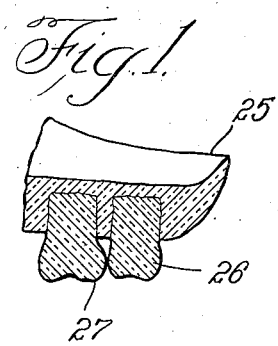
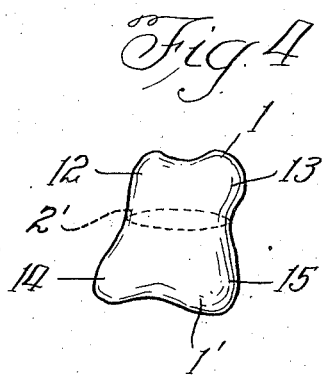
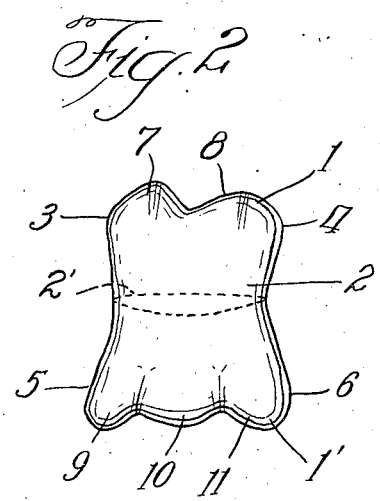
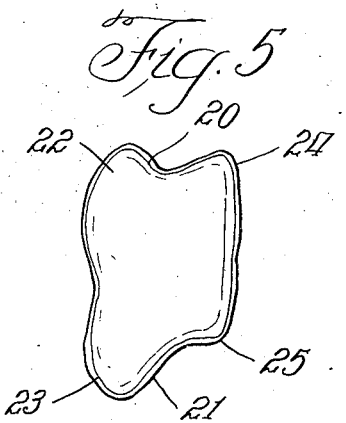
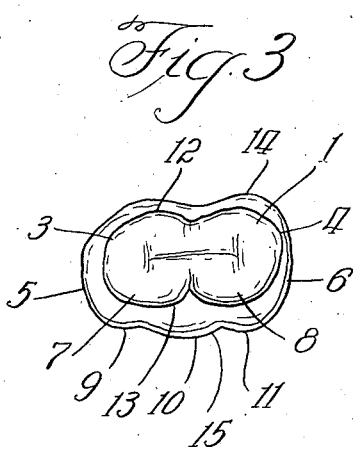
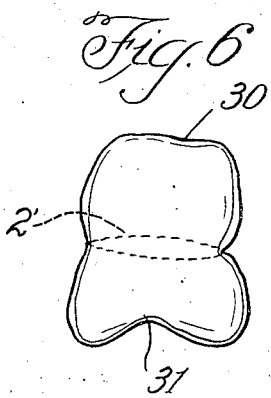
INVENTOR.
Jacob A. Saffir Patented June 18, 1946

2,402,259

UNITED STATES PATENT OFFICE 2,402,259

ARTIFICIAL TOOTH

Jacob A. Saffir, Chicago, Ill., assignor to Dentists' Supply Company of New York, New York, N. Y.

Application June 12, 1942, Serial No. 446,711

3 Claims. (Cl. 32—8)

1

This invention relates to improvements in artificial teeth. A desirable adaptation comprises teeth blanks made of plastics and especially of synthetic resinous materials. Considering plastic teeth as illustrative of the invention, they are generally retained in position in a denture by a fusion or adhesion of the teeth to the base plate or denture material.

Prior to the permanent setting of one or more plastic teeth in a bridge or plate it is customary to fit various teeth in wax. The differences that occur naturally in teeth may be almost unlimited. Thus, teeth may differ in cusp angle, size, and in their surface contour or peripheral configuration generally, as well as in their shade. In order to provide a satisfactory restoration, it is highly desirable that the artificial teeth be precisely shaped for cooperation with opposing teeth.

It is thus evident that a dentist should have a large number of different kinds of teeth for fitting purposes. Because, however, of the attendant expense, only a limited number of teeth are generally available for fitting and it has heretofore been the practice to have one tooth blank on hand for one type of tooth, relying upon surface grinding to obviate discrepancies of fit.

This provision, particularly when the teeth are made of plastic, has militated against thoroughly satisfactory work on the part of the dentist unless substantial time and money were expended. At the same time, the patient and dentist have had to be satisfied with an inferior choice because of the limited number of teeth available, and the dentist who attempted to comply with all the particular requirements of the case was forced to make a charge accordingly.

As previously pointed out, before final choice is made of the number and types of artificial teeth, it is necessary to try various teeth in a wax form. Once one or more of such plastic teeth are tried in a patient's mouth and such teeth are discarded as inapplicable for a given denture, it is necessary to sterilize these teeth blanks if they are to be retained for future use on other patients.

Sterilization of plastic teeth is difficult and may involve some damage to the teeth, physically and chemically. Thus, many plastics cannot safely withstand boiling water, while such sterilizing agents as alcohol and the like have a deleterious effect on the composition.

If, after a try-in, an artificial tooth has some possibilities of use but requires work thereon, then it is necessary for the dentist or the dental assistant to operate upon or modify the peripheral configuration, such as the occlusal surface of the tooth blank, to adapt it for use in a denture.

In many instances a tooth blank may have to be discarded entirely after operating thereon, such as by recarving, because of excessive removal of material commensurate with a proper fit, or failure to achieve the proper final esthetic result. In any event, it is evident that considerable time and material may be required before satisfactory teeth are obtained for use in a denture.

This invention provides a tooth blank construction whereby the number of possible artificial tooth variations is greatly increased; and in fact, at least doubled with any given number of blanks. Differently stated, without any increase in the number of tooth blanks required to be kept on hand, the available variations as to tooth surface contour or configuration, such as occlusal surfaces and/or color shade, are at least doubled.

This invention furthermore provides a construction whereby the permanent spoiling of one tooth surface will not necessarily result in the discarding of the entire tooth blank. The construction provided by this invention permits the fitting of two different teeth before any sterilization is necessary, assuming that the entire tooth blank is unsuitable for the particular purpose.

By virtue of the invention hereinafter described, it is possible for a dentist to have twice as many artificial teeth as blanks, thus permitting more precise fitting of a tooth in a denture. This increase in the number of teeth from which to choose is particularly important where the denture is to be utilized opposite a series of composite teeth, some of which may be natural and some of which may be artificial, and the surfaces of which may vary from each other.

This invention in general consists of a tooth blank having both halves formed as separate teeth blank sections of differentiated contour or configuration, such as different potential functioning occlusal surfaces at the respective ends. In order to more fully illustrate the invention, reference will now be made to the drawing wherein certain examples are shown by way of illustration.

Figure 1 is a sectional elevation of a denture showing the mounting of teeth embodying this invention.

Figure 2 is an elevation of one form of tooth embodying this invention.

Figure 3 is a plan view of the tooth of Figure 2.

Figure 4 is an elevation of a modified form of tooth.

Figures 5 and 6 are elevations of different teeth modifications.

A more detailed description of these will now be given. Like numerals indicate similar structural portions on the various figures of the drawing.

Referring to Figures 2 to 4 inclusive, a tooth blank is shown having occlusal surfaces 1 and 1' on the opposite ends thereof. These surfaces are separated by a comparatively restricted waist portion 2, the outer peripheral surface of which functions as a buccal surface.

In the particular form shown here, the mesiodistal width of the top portion of the tooth, as between points 3 and 4, is smaller than the corresponding width from points 5 to 6, of the bottom portion. Conforming to the narrower top portion, only two buccal cusps 7 and 8, are provided at the top occlusal surface. By contrast, the bottom and wider portion of the blank has three buccal cusps, 9, 10, and 11.

Thus with the blank shown in Figs. 2 and 3, it is possible to provide an additional groove transversely to generate two lingual cusps and thus have a narrow four cusped molar at occlusal surface 1.

On the other hand, if a five cusped tooth is desired, the bottom portion of the tooth of Figs. 2 and 3 may be used and shaped to provide two lingual cusps.

As seen in Figure 3, the bottom portion of the tooth blank shown in Figure 2 is larger in all directions than the top portion of the tooth blank. In addition to the differences along the mesio distal dimension, there is also a difference in the transverse direction. Thus, the buccolingual distance between 12 and 13 of occlusal surface 1, is narrower than the corresponding distance 14 and 15 of the bottom portion 1' of the tooth blank, and similar distinctions will be apparent in the tooth modification of Fig. 4.

Referring now to Figure 5, a blank is shown having bicuspid surfaces at both ends thereof. Thus, as seen in Figure 5, the upper portion of the blank has an occlusal surface 20, while the bottom has an occlusal surface 21.

Referring to occlusal surface 20, 22 is the buccal cusp while 24 is the lingual cusp. As is clearly evident from this figure, these two cusps are approximately symmetrical with the longitudinal axis of the blank. By contrast, occlusal surface 21, has a buccal cusp 23 substantially greater than lingual cusp 25.

Figure 6 shows a tooth blank of a molar having occlusal surfaces 30 and 31 respectively. Occlusal surface 30 may be flat or mechanical, without cusps, while occlusal surface 31 is shaped to provide two cusps.

In all cases it is preferred to have the peripheral surface of the tooth blank taper so that the blank becomes smaller as the center or waist portion 2' thereof is reached. It will be noted that this waist portion is of reduced or restricted cross-sectional area, compared with the maximum cross-sectional area of the tooth blank, as shown in the elevational views of the various figures of the drawing. In effect, it determines an intermediate or median plane transverse to the longitudinal or vertical axis of the blank, thereby essentially dividing said blank into two distinct sections, either of which structurally and in surface contour defines an artificial tooth, or at least the exposed portion thereof.

Any suitable plastic material, such as methyl methacrylate, may be used for making the tooth blanks and supporting material.

Thus in Figure 1, a support 25 may have firmly anchored therein two teeth 26 and 27. In the event that any one or more blanks are too long the portion of the blank to be anchored may be cut down. The resulting structure may then be molded together so that the teeth and support are unitary.

However, where the whole blank is used without cutting, the section or portion thereof anchored to the support will inherently function to provide an improved attachment. For example, where the tooth section opposite to that selected for use as a tooth, is embedded in the denture plate in a manner analogous to the showing of Fig. 1, the taper of the embedded section will afford a substantially firmer attachment than that otherwise attainable. Any contour or surface variations of the said embedded section, illustratively such as may occur at the end of a section having an occlusal or other surface with characteristic irregularities, will further enhance the attachment in view of the increased area of contact with the denture plate material. It will be understood that this use of the entire blank does not preclude any alterations which may be applied thereto for the purpose of adjustment prior to its attachment to the plate.

It is understood that the two portions of the tooth blank may differ not only in mechanical shape as hereinbefore disclosed, but also with regard to shade or color. Accordingly it is possible to have a blank with both ends identical in shape or different in shape as the case may be, and also have the shade or color of the blank different on opposite sides of the median plane.

While I have described my invention in accordance with desirable embodiments, it is obvious that many changes and modifications may be made in the details of construction and in the combination and arrangement of parts without departing from the spirit of the invention as defined in the following claims.

Having thus set forth my invention, I claim:

1. A tooth blank for prosthetic dentures comprising two sections integral with each other, a waist portion intermediate the longitudinal axis of said blank, and having a restricted cross section as compared with the maximum cross-sectional area of said blank, said waist portion determining said sections, said sections each defining at least the exposed portion of an artificial tooth structurally and in surface contour, relative to said waist portion.

2. A tooth blank for prosthetic dentures comprising two sections integral with each other, a waist portion intermediate the longitudinal axis of said blank and having a restricted cross-section as compared with the maximum cross-sectional area of said blank, said waist portion determining said sections, the peripheral surface of each of said sections tapering toward said waist portion, an occlusal surface at the respective end portions of said blank, each determining the occlusal surface for one of said sections, said sections defining at least the exposed portion of an artificial tooth structurally and in surface contour, relative to said waist portion.

3. A tooth blank adapted for prosthetic dentures comprising two sections integral with each other, a waist portion intermediate the longitudinal axis of said blank, having a restricted cross-section as compared with the maximum cross-sectional area of said blank, said waist portion determining said sections, the peripheral surface of each of said sections tapering toward said waist portion, an occlusal surface at the respective end portions of said blank, each determining the occlusal surface for one of said sections, the mesio-distal and transverse dimensions of said occlusal surfaces being differentiated.

JACOB A. SAFFIR.